(12) United States Patent
Aslund

(10) Patent No.: US 9,380,059 B2
(45) Date of Patent: Jun. 28, 2016

(54) SYSTEMS AND METHODS FOR CONFIGURING AN ELECTRONIC DEVICE

(71) Applicant: Spotify AB, Stockholm (SE)

(72) Inventor: Jon Aslund, Stockholm (SE)

(73) Assignee: SPOTIFY AB, Stockholm (SE)

( * ) Notice: Subject to any disclaimer, the term of this patent is extended or adjusted under 35 U.S.C. 154(b) by 151 days.

(21) Appl. No.: 14/055,658

(22) Filed: Oct. 16, 2013

(65) Prior Publication Data

US 2015/0106887 A1    Apr. 16, 2015

Related U.S. Application Data

(60) Provisional application No. 61/891,724, filed on Oct. 16, 2013.

(51) Int. Cl.
*H04L 29/08* (2006.01)
*H04L 29/06* (2006.01)
*H04W 12/04* (2009.01)
*H04W 12/06* (2009.01)

(52) U.S. Cl.
CPC ........ *H04L 63/0861* (2013.01); *H04L 63/0492* (2013.01); *H04L 63/062* (2013.01); *H04L 63/08* (2013.01); *H04L 65/1069* (2013.01); *H04L 67/141* (2013.01); *H04W 12/04* (2013.01); *H04W 12/06* (2013.01); *H04L 63/0853* (2013.01); *H04L 63/18* (2013.01)

(58) Field of Classification Search
None
See application file for complete search history.

(56) References Cited

U.S. PATENT DOCUMENTS

| 8,369,972 | B2 | 2/2013 | Topchy et al. |
| 2006/0143455 | A1 | 6/2006 | Gitzinger |
| 2007/0067833 | A1* | 3/2007 | Colnot ............................. 726/9 |
| 2008/0141313 | A1 | 6/2008 | Kato et al. |
| 2008/0175187 | A1* | 7/2008 | Lowry et al. .................. 370/328 |
| 2008/0209056 | A1 | 8/2008 | Choi |
| 2009/0180659 | A1* | 7/2009 | Sander et al. ................. 381/384 |
| 2009/0224906 | A1* | 9/2009 | Balgard .............. H04L 41/0809 340/539.1 |
| 2013/0223279 | A1* | 8/2013 | Tinnakornsrisuphap H04L 41/0809 370/254 |
| 2014/0006483 | A1 | 1/2014 | Garmark et al. |

FOREIGN PATENT DOCUMENTS

| EP | 2579608 A1 * | 4/2013 |
| GB | 2500701 A | 10/2013 |

OTHER PUBLICATIONS

Bender et al., "Techniques for Data Hiding," IBM Systems Journal, vol. 35, Nos. 3 & 4, 1996, 24 pgs.

(Continued)

*Primary Examiner* — Fatoumata Traore
(74) *Attorney, Agent, or Firm* — Morgan, Lewis & Bockius LLP

(57) ABSTRACT

A method for configuring a device is performed at a target device with a processor and memory storing instructions for execution by the processor. In some implementations, the target device is a media presentation device, such as a WiFi enabled speaker system. Connection information is received from a configuration device, such as a laptop computer or mobile telephone, via an analog audio interface. The connection information includes first account credentials. In some implementations, the connection information also includes network configuration data such as a name of wireless network and a security key. The target device connects to a server system remote from the target device using the first account credentials.

17 Claims, 10 Drawing Sheets

(56) References Cited

OTHER PUBLICATIONS

Cox et al., "Secure Spread Spectrum Watermarking for Multimedia," IEEE Transactions on Image Processing, vol. 6, No. 12, Dec. 1997, 15 pgs.
Gopalan et al., "Audio Steganogrphy for Covert Data Transmission by Imperceptible Tone Insertion," from Proceedings (422) Communication Systems and Applications (CSA 2004), 5 pgs.
International Search Report, PCT/IB2014/002808, Mar. 18, 2015, 12 pgs.
CMPBooks, "Newton's Telecom Dictionary," 22nd Edition, Copyright © 2006 Harry Newton, San Francisco, CA, 3 pgs.
Freedman, A., "The Computer Glossary," The Complete Illustrated Dictionary Ninth Edition, © 2001, 1998,1995,1993,1991,1989,1983,1981, ISBN 0-8144-7094-7, New York, NY, 3 pgs.
Walker, M.B., "Chambers Dictionary of Science and Technology," © Chambers Harrap Publishers Ltd 1999, ISBN 0 550 141103, New York, NY, 3 pgs.
Spotify AB, International Preliminary Report on Patentability, PCT/IB2014/002808, Apr. 19, 2016, 9 pgs.

* cited by examiner

SYSTEMS AND METHODS FOR CONFIGURING AN ELECTRONIC DEVICE

RELATED APPLICATION

This application claims priority and benefit to U.S. Provisional Patent Application No. 61/891,724, entitled "Systems And Methods For Configuring An Electronic Device," filed Oct. 16, 2013, which is incorporated by reference in its entirety.

TECHNICAL FIELD

The disclosed implementations relate generally to configuring an electronic device, and more specifically, to providing connection information to a target device.

BACKGROUND

Increasingly, modern electronic devices are able to connect to and communicate with other devices via wired or wireless communication paths. For example, many electronic devices include communication capabilities for communicating with other devices through the Internet, local-area-networks (LANs), peer-to-peer networks, and the like. However, these devices must be configured in order to join the networks and/or establish communications with other devices. For example, in order for a device to connect to a WiFi network, it may be necessary to select an available WiFi network and provide a security key. Further, in order for a device to communicate with and receive content from other devices, such as a cloud-based media content provider, the device may need account credentials, authorization tokens, or other information in order to log in to or access the other devices. But it can be difficult to input network configuration data and account credentials into devices that have limited or no user interface components, such as those without a screen or a keyboard.

SUMMARY

The various implementations described herein relate to using a configuration device to configure certain aspects of a target device. For example, a target device, such as a WiFi enabled speaker system, may require wireless-network configuration data in order to connect to a wireless network and account credentials in order to connect to, and receive media content from, a remote content server. Thus, in some implementations, described herein, a configuration device sends network configuration data and account credentials (e.g., a username and a password) to the target device. The target device, in turn, uses the information from the configuration device to connect to the WiFi network and/or a remote server.

In some implementations, connection information is stored on the configuration device, and is sent to the target device without requiring the user to enter or re-enter the information. For example, account credentials for a media content provider may have been previously input into an application on the configuration device to allow the application to access the media content provider. These account credentials can then be retrieved from the application and provided to the target device. Similarly, network information (e.g., security and/or encryption type, a WiFi service set identifier (SSID), and security key) that is stored in the configuration device (e.g., so that the configuration device itself can connect to the network) can be retrieved from the configuration device and provided to the target device. Alternatively, account credentials and network configuration data can be manually input by the user if they have not yet been stored on, or are otherwise inaccessible to, the configuration device. Thus, configuration settings can be provided to a target device quickly and easily, even if the target device does not have a user interface, or has a user interface with which it would be cumbersome to input such configuration settings.

In some implementations, connection information, such as account credentials and network configuration data, is sent from a configuration device to a target device via an audio interface. Various techniques may be used to transmit data in this way, such as by encoding the connection information into a sound that is emitted by the configuration device (e.g., with a speaker) and received by the target device (e.g., with a microphone). As another example, the configuration device can embed the connection information into an analog carrier signal, and send the signal to the target device using audio ports on both devices that are configured for sending and receiving analog audio signals (e.g., headphone and line-in ports).

In addition to sending connection information to target devices, configuration devices can also be used as remote controls for the target device, performing a range of media control functions. For example, a mobile phone (an example of a configuration device) can be used to browse for, select, and control playback of music at a separate speaker system. But different users may wish to control the speaker system with their own remote-control devices, and may wish to access a streaming media service using their own account. This way, the user can access his or her own playlists, radio stations, track listening history, and other user-specific or account-specific information. Also, some media content providers are able to share information about a user's media consumption to a social network, such as when a user configures a media content provider to share the user's current music selections with a group of friends on a social networking site such as FACEBOOK.

Accordingly, in some implementations, a target device stores account credentials of various users (e.g., users who have provided their account information to the target device via a pairing procedure or otherwise). Then, when media control requests are received from a remote control device (e.g., a mobile phone, tablet, etc.), the target device identifies the account credentials of the user, and provides the account credentials (or any unique identifier of the user) to a media content provider when executing the media control request.

EXEMPLARY IMPLEMENTATIONS

A method is provided for configuring a device. The method is performed at a target device with a processor and memory storing instructions for execution by the processor. The method includes receiving connection information from a configuration device, via an analog audio interface, the connection information including first account credentials; and connecting to a server system remote from the target device using the first account credentials. In some implementations, the connection information further includes network configuration data, the method further comprising connecting to a network using the network configuration data.

In some implementations, connecting to the server system comprises: providing the first account credentials to the server system; and establishing an authorized session between the target device and the server system.

In some implementations, the analog audio interface includes an audio input component coupled to the target device.

In some implementations, the analog audio interface includes a microphone, and receiving the connection information includes detecting sound emitted by the configuration device.

In some implementations, the configuration information is steganographically embedded into the sound emitted by the configuration device. In various implementations, the sound is a song, a musical scale, etc.

In some implementations, the sound emitted by the configuration device is a sequence of tones, the sequence of tones including tones of a first pitch (and/or duration) and tones of a second pitch (and/or duration), wherein tones of the first pitch (and/or duration) represent a numeric value of 0 and tones of the second pitch (and/or duration) represent a numeric value of 1.

In some implementations, the analog audio interface includes a tip-ring-sleeve (TRS) connector, and receiving the connection information includes receiving, via the TRS connector, an analog carrier signal emitted by the configuration device. In some implementations, the analog carrier signal includes digitized data corresponding to the connection information.

In some implementations, the method further includes extracting the connection information by demodulating the received analog carrier signal.

In some implementations, the network configuration data is manually entered at the configuration device by a user. In some implementations, the network configuration data is acquired from a network configuration setting of the configuration device.

In some implementations, the network configuration data includes an identifier of a wireless network. In some implementations, the identifier is a service set identifier (SSID).

In some implementations, the network configuration data includes a security key associated with the wireless network.

In some implementations, the network configuration data corresponds to network configuration data of a network to which the configuration device is connected.

In some implementations, the first account credentials include an account identifier and a password. In some implementations, the first account credentials correspond to account credentials stored on the configuration device in association with an application on the configuration device.

In some implementations, the target device is configured to receive media content from the server system.

In some implementations, the method further includes: receiving media content from the server system; and presenting the media content, wherein the first account credentials authorize the target device to receive the media content from the server system.

In some implementations, the media content is audio content, and the target device is a speaker system and/or a stereo system.

In some implementations, the method further includes: determining if the target device is coupled to a communications network; upon determining that the target device is not coupled to the communications network, requesting network configuration data from the configuration device; and receiving the network configuration data from the configuration device.

In some implementations, the method further includes receiving a plurality of account credentials, the plurality of account credentials including the first account credentials; receiving a media control request including information identifying particular account credentials of the plurality of account credentials; and sending a server media control request to the server, the server media control request including the information identifying the particular account credentials.

In some implementations, respective ones of the plurality of account credentials are stored in association with respective unique user identifiers, and wherein the information identifying the particular account credentials is one of the unique user identifiers. In some implementations, the unique user identifiers are media access control (MAC) addresses.

In some implementations, the method further includes: receiving media content from the configuration device via the analog audio interface; and presenting the media content.

In some implementations, the configuration device is a mobile phone or a stereo

In some implementations, the server system is associated with a media content provider.

A method is provided for configuring a device. The method is performed at a configuration device with a processor and memory storing instructions for execution by the processor. The method includes acquiring account credentials associated with an application stored on the configuration device; acquiring network configuration data corresponding to a network to which the configuration device is connected; and sending the account credentials and the network configuration data to a target device.

In some implementations, the method further includes: receiving a request from a user to send the network configuration data and the account credentials to the target device; and sending the network configuration data and the account credentials to the target device in response to the request.

In some implementations, the application is a media player application that is configured to receive media from one or more remote sources.

In some implementations, the sending including sending the account credentials and the network configuration data to the target device via an analog audio interface. In some implementations, the analog audio interface includes a speaker, and sending the account credentials and the network configuration data to the target device includes emitting sound with the speaker.

In some implementations, the method includes steganographically embedding the account credentials and the network configuration data into the sound for emission by the speaker. In some implementations, the sound emitted by the configuration device is a song, and/or a musical scale.

In some implementations, the method includes encoding the network configuration data and the account credentials into a bitstream. In some implementations, the sound emitted by the configuration device is a sequence of tones corresponding to the bitstream, the sequence of tones including tones of a first pitch (and/or duration) and tones of a second pitch (and/or duration), wherein tones of the first pitch (and/or duration) represent a numeric value of 0 and tones of the second pitch (and/or duration) represent a numeric value of 1.

In some implementations, the method includes modulating an analog carrier signal to encode the bitstream into the analog carrier signal. In some implementations, the analog audio interface includes a tip-ring-sleeve (TRS) connector, and sending the account credentials and the network configuration data to the target device includes sending the analog carrier signal including the encoded bitstream via the TRS connector.

In some implementations, the configuration device is selected from the group consisting of: a mobile phone; a speaker system; a stereo; a computer; and a digital media player.

In some implementations, the target device is selected from the group consisting of: a mobile phone; a speaker system; a stereo; a computer; and a digital media player.

In accordance with some implementations, a computer-readable storage medium (e.g., a non-transitory computer readable storage medium) is provided, the computer-readable storage medium storing one or more programs for execution by one or more processors or cores of an electronic device, the one or more programs including instructions for performing any of the methods described herein.

In accordance with some implementations, an electronic device is provided that comprises means for performing any of the methods described herein.

In accordance with some implementations, an electronic device is provided that comprises a processing unit configured to perform any of the methods described herein.

In accordance with some implementations, an electronic device is provided that comprises one or more processors (or cores) and memory storing one or more programs for execution by the one or more processors (or cores), the one or more programs including instructions for performing any of the methods described herein.

In accordance with some implementations, an information processing apparatus for use in an electronic device is provided, the information processing apparatus comprising means for performing any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
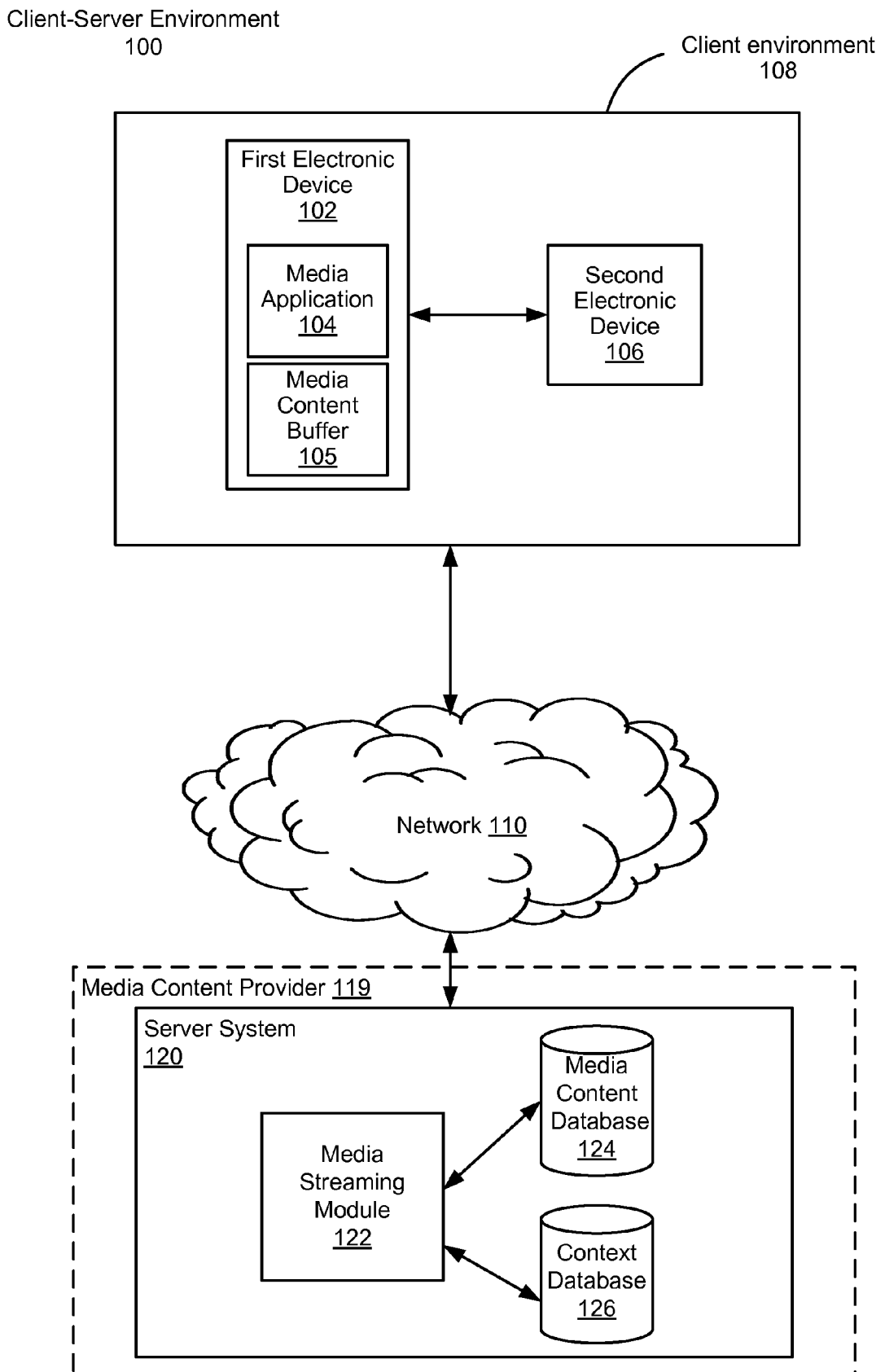
FIG. 1 is a block diagram illustrating a client-server environment, in accordance with some implementations.

Attention is now directed to the figures, and in particular to FIG. 1, which is a block diagram of a client-server environment, according to some implementations. The client-server environment 100 includes a client environment 108 and a server system 120 that are connected through a network 110. In some implementations, the client environment 108 includes two or more electronic devices (e.g., the first electronic device 102 and the second electronic device 106). For simplicity, only one first electronic device 102 and one second electronic device 106 are shown, though the client environment 108 may have more first and second electronic devices. In some implementations, the server system 120 is associated with a media content provider 119 with which users may have accounts that enable the user to access media content from the server system 120.

The network 110 includes any of a variety of networks, including wide area networks (WAN), local area networks (LAN), wireless networks, wired networks, the Internet, or a combination of such networks.

In some implementations, the client environment 108 includes a first electronic device 102 and a second electronic device 106. In some implementations, the first and the second electronic devices 102, 106 are devices selected from the group consisting of: desktop computers, laptop computers, tablet computers, mobile electronic devices, mobile phones, digital media players, WiFi enabled speaker systems, home audio/visual systems (e.g., stereos, home audio/visual receivers), or any other appropriate electronic devices. The first electronic device 102 is also referred to herein as a configuration device, and the second electronic device 106 is also referred to herein as a target device.

In some implementations, both the first electronic device 102 and the second electronic device 106 are on the same local network that allows devices within the client environment 108 to communicate to one another.

In some implementations, the first electronic device 102 includes a media content presentation and control application 104 (hereinafter "media application"). The media application 104 is able to control the presentation of media at the first electronic device 102. For example, the media application 104 enables a user to navigate media content items, select media content items for playback on the electronic device 102, create and edit playlists, etc. In some implementations, media content is stored on the first electronic device 102. In some implementations, the media content is also or instead stored on a server system 120 located remotely from the first electronic device 102. Media content can be downloaded or streamed from the server system 120 to the first electronic device 102 over the network 110.

In some implementations, the media content streamed from the server system 120 is temporarily stored/cached at the first electronic device 102 in a media content buffer 105 in the memory of the first electronic device 102. In some implementations, media content stored in the media content buffer 105 is removed after the media content is presented at the first electronic device 102, allowing new media content data to be stored in the buffer 105. In other implementations, at least some of the media content stored in the media content buffer 105 is retained for a predetermined amount of time after the content is presented at the first electronic device 102 and/or until other predetermined conditions are satisfied.

In some implementations, the media application 104 also communicates with the second electronic device 106 to provide connection information to the second electronic device 106, including, for example, account credentials and network configuration data. In some implementations, the media application 104 communicates with the second electronic device 106 using analog audio interfaces of the first electronic device 102 and the second electronic device 106. Systems and methods for providing connection information to the second electronic device 106 from the first electronic device 102 are discussed herein.

In some implementations, the media application 104 performs operations for acquiring connection information from the first electronic device 102 or from a user. For example, connection information may be retrieved by the media application 104 from storage on the first electronic device 102 for provisioning to the second electronic device 106.

Various techniques may be used to obtain network information from the first electronic device 102 depending on the type of operating system of that device. For example, the information may be retrieved by reading the contents of a file (e.g., a configuration file stored in memory on the first electronic device) or by executing an application programming interface (API) command, a program, a script, or any other command that will identify or retrieve the network information. As specific examples, if the operating system of the first electronic device 102 is an ANDROID operating system, the network information may be retrieved from the file "/data/misc/wifi/wpa supplicant.conf". If the operating system is APPLE's IOS, the network information may be retrieved by executing an appropriate API command. If the operating system is APPLE's MAC OS, the network information may be retrieved using a KEYCHAIN command (to retrieve a WiFi security key) and/or using the "airport-I" command (to retrieve an SSID). If the operating system is MICROSOFT's WINDOWS XP, the network information may be retrieved by executing a script (e.g., a VBSCRIPT) that will return the desired information. If the operating system is a GNU/LINUX operating system, the network information may be retrieved by executing an "iwgetid" command and/or using the "gnome-keyring-manager" program.

In some implementations, the media application 104 retrieves and provides to the second electronic device 106 information that is associated with the application 104 itself. For example, the media application 104 retrieves and provides to the second electronic device 106 account credentials (e.g., a username and/or account name and a password) that are used by the media application 104 to connect to another electronic device (e.g., the server 120 associated with the media content provider 119). As another example, the media application 104 retrieves and provides to the second electronic device 106 an authorization token (e.g., a random or pseudorandom string) associated with the media application 104 and/or a user of the media application 104. The authorization token may be generated by a server (e.g., the server system 120 associated with the media content provider 119) and received at the media application 104, for example, in response to a successful login by a user.

In some implementations, instead of retrieving stored connection information from the operating system or the media application 104, the media application 104 prompts the user to provide the connection information manually.

In some implementations, the media application 104 is also able to control media content presentation at the second electronic device 106. Thus, the media application 104 allows the first electronic device 102 to act as a media presentation device, a configuration device, and a remote control for other media presentation devices.

The client-server environment 100 also includes a server system 120 associated with a media content provider 119. In some implementations, the server system 120 includes a media streaming module 122, a media content database 124, and a context database 126. The media content database 124 stores media content that can be presented by an electronic device. For example, in some implementations, the media content database 124 stores audio (e.g., music, audiobooks, etc.), video (e.g., movies, television shows, etc.), images, or other content that can be streamed and/or otherwise transmitted to other electronic devices. In some implementations, the media content database includes data stored in different formats and file types to allow a variety of different devices and/or applications to receive streamed content. In some implementations, the data is stored in a single file format and is converted/transcribed to the appropriate data type before or as it is streamed to a remote device.

In some implementations, the server system 120 includes a media streaming module 122. The media streaming module 122 receives media control requests from an electronic device and, in response, streams and/or otherwise transmits media content to either the requesting device or another device. These and other techniques for controlling media presentation are discussed in greater detail in U.S. application Ser. No. 13/784,704, entitled "Systems and Methods for Multi-Path Control Signals for Media Presentation Devices," filed on Mar. 4, 2013, the entire disclosure of which is incorporated herein by reference.

Figure 2:
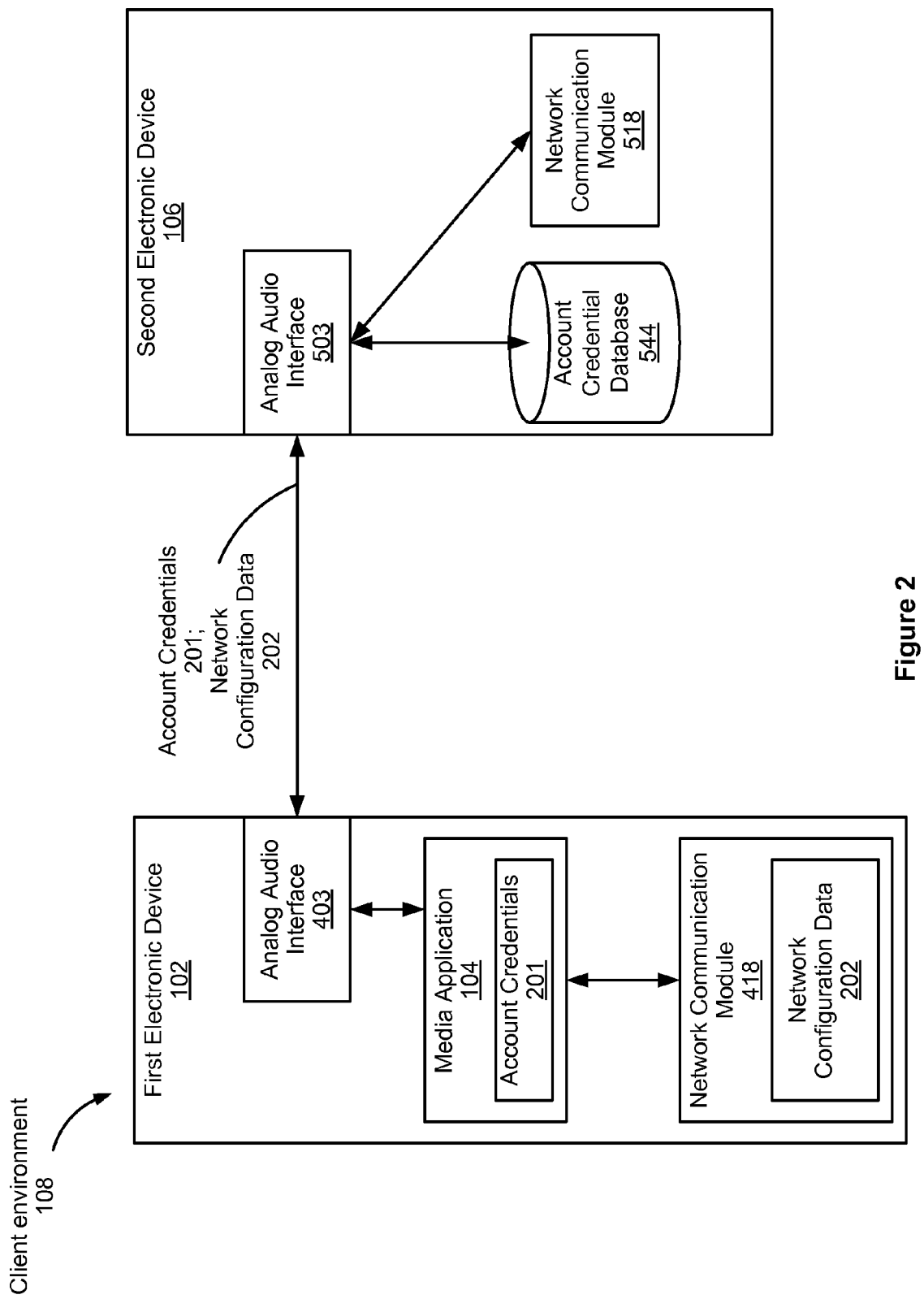
FIG. 2 is a block diagram illustrating a client environment, in accordance with some implementations.

FIG. 2 is a block diagram illustrating the client environment 108, in accordance with some implementations. The client environment includes the first electronic device 102 and the second electronic device 106. The first electronic device includes a media application 104, as described above, and a network communication module 418 (described herein with reference to FIG. 4).

The media application 104 includes account credentials 201 including, for example, a username and a password. The account credentials 201 authorize the media application 104 to access a media content server 120 (FIG. 1) and to control the transmission of media content therefrom. The network communication module 418 includes network configuration data 202 including, for example, an SSID and a network security key. Network configuration data may also or alternatively be stored on and/or in association with the operating system of the first electronic device 102. The network configuration data 202 can be used by the first electronic device 102 to connect to a wireless communications network (e.g., a local area network).

Figure 4:
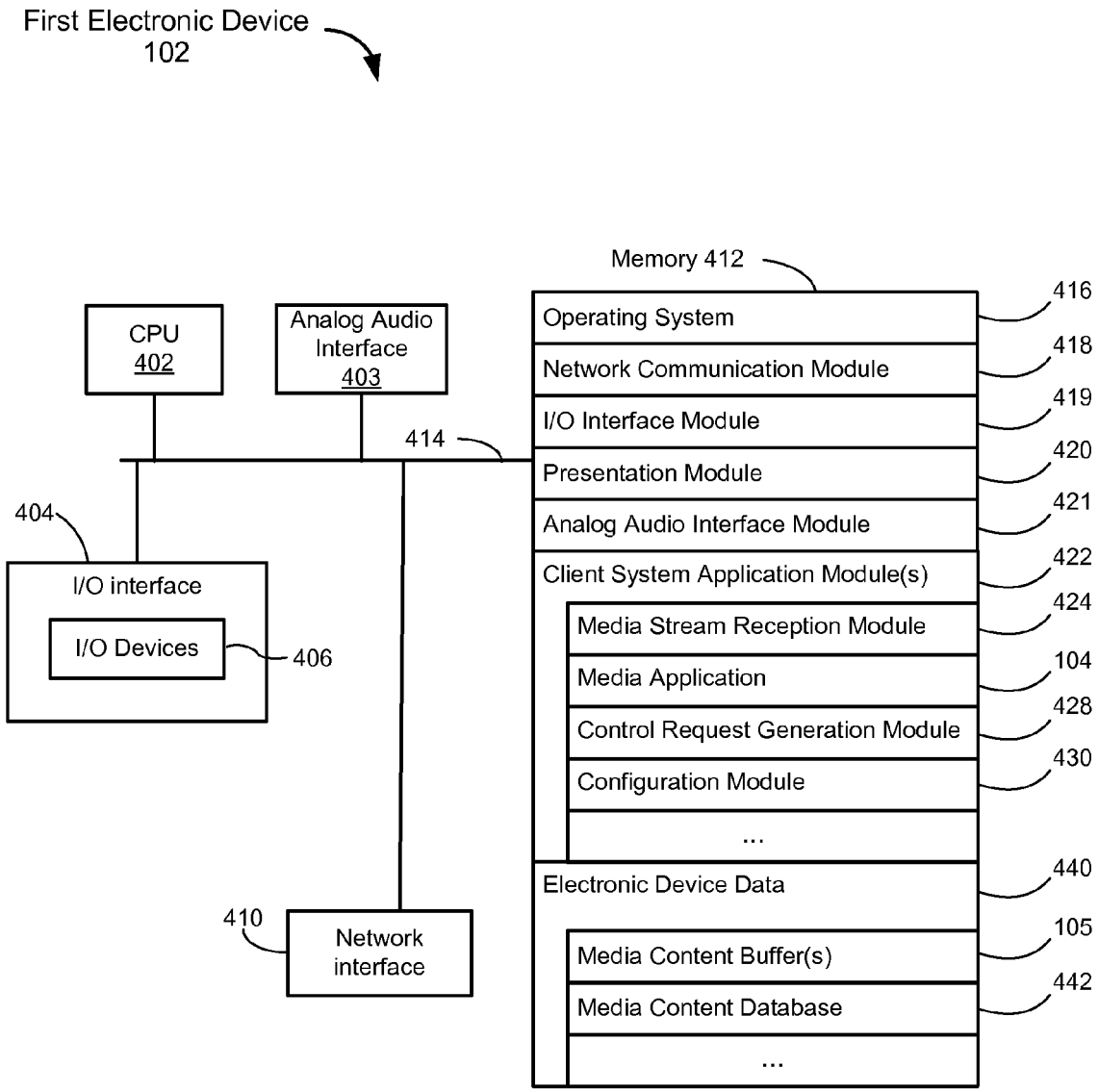
FIG. 4 is a block diagram illustrating an electronic device, in accordance with some implementations.

The first electronic device 102 also includes an analog audio interface 403 (described herein with reference to FIG. 4). The analog audio interface 403 includes hardware and/or software for outputting analog audio signals, as well as encoding/embedding information in the analog audio signal. For example, in some implementations, the analog audio interface 403 includes a speaker for outputting sounds that include encoded/embedded information to be received by a target device. Techniques for encoding/embedding the account credentials 201 and the network configuration data 202 into analog audio signals and sending them via an analog audio interface are discussed herein.

The second electronic device 106 also includes an analog audio interface 503 (described herein with reference to FIG. 5), with which the second electronic device 106 receives the account credentials 201 and/or the network configuration data 202 from the first electronic device 102. The analog audio interface 503 includes hardware and/or software for receiving analog audio signals, as well as for decoding/extracting information from the analog audio signal. For example, in some implementations, the analog interface 503 includes a microphone for receiving an analog audio signal from a configuration device, such as the first electronic device 102.

Account credentials 201 received from one or more first electronic devices are stored in the account credential database 544 in the second electronic device 106. Also, the network configuration data 202 is stored in (or stored for access by) the network communication module 518 (and/or in association with an operating system of the second electronic device 106). The account credential database 544 and the network communication module 518 are described herein with reference to FIG. 5. In some implementations, the second electronic device 106 uses the network configuration data 202 to connect to a communications network (e.g., a wireless network), and/or uses the account credentials 201 to establish an authorized communications session with a remote server (e.g., the server system 120).

Figure 3:
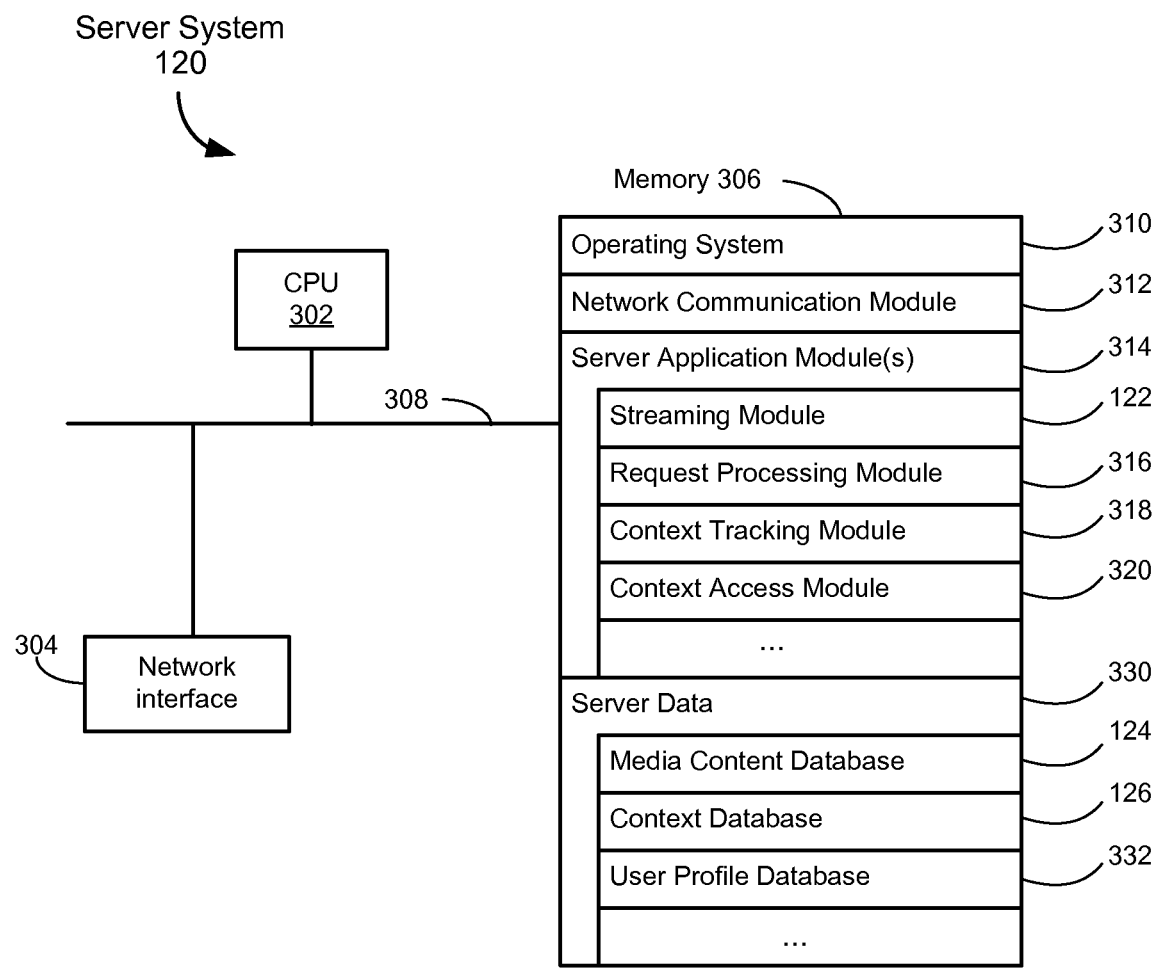
FIG. 3 is a block diagram illustrating a server system, in accordance with some implementations.

FIG. 3 is a block diagram illustrating a server system 120, in accordance with some implementations. The server system 120 typically includes one or more processing units or cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more network interfaces 304 (wired or wireless) and one or more communication networks, such as the Internet, other Wide Area Networks, Local Area Networks, Personal Area Networks, metropolitan area networks, VPNs, and so on;
- one or more server application module(s) 314 for enabling the server system 120 to perform the functions offered by the server system 120, including but not limited to:
  - a streaming module 122 for streaming and/or otherwise transmitting media content to an electronic device (e.g., first and/or second electronic devices 102, 106, FIG. 1) remote from the sever system 120;
  - a request processing module 316 for receiving requests from electronic devices (e.g., first and/or second electronic devices 102, 106, FIG. 1), wherein the requests include requests to stream or otherwise transmit specified media content to the electronic devices, requests to change the destination of a media content stream from a first electronic device to a second electronic device, and/or any other appropriate request (e.g., requests to stop or pause media content, etc.);
  - a context tracking module 318 for tracking and storing the context of a media content stream, including storing, among other data, the current playback position in a media content stream that is currently being presented by an electronic device (e.g., first and/or second electronic devices 102, 106, FIG. 1), the position in a current playlist, the play history of a user, the preferences of a user, previously skipped media content, whether media content items were "liked" or "disliked" (e.g., via "starred," "thumbs-up," and/or "thumbs-down" indications), and the like;
  - a context access module 320 for allowing electronic devices (e.g., first and/or second electronic devices 102, 106, FIG. 1) associated with a given user account to access the current context for media content streams associated with the given user account; and
- one or more server data module(s) 330 for storing data related to the server system 120, including but not limited to:
  - a media content database 124 including a library of media content;
  - a context database 126 including information associated with one or more media content streams, wherein context information includes the current playback position in a media content stream, metadata relating to the media, a position in a playlist, play history of a user, user preferences, skipped media, and user settings; and
  - a user profile database 332 including account information for a plurality of users, each account including user media histories, user preferences, and determined user interests, and each account associated with a username, a password, and a unique user identifier.

FIG. 4 is a block diagram illustrating a first electronic device 102, in accordance with some implementations.

In some implementations, the first electronic device 102 is a desktop computer, a laptop computer, a tablet computer, a mobile electronic device, a mobile phone, a digital media player, a WiFi speaker system, or a home audio/visual system (e.g., a stereo, home audio/visual receiver).

The first electronic device 102 typically includes one or more CPUs 402, one or more network interfaces 410, memory 412, and one or more communication buses 414 for interconnecting these components. The first electronic device 102 includes an I/O interface 404. The I/O interface 404 couples input/output devices 406 of the first electronic device 102, such as displays, microphones, speakers, keyboards, mice, buttons, and touch screens, to the I/O interface module 419. The I/O interface 404, in conjunction with the I/O interface module 419, receives user inputs (e.g., voice input, keyboard inputs, touch inputs, etc.) and processes them accordingly.

The first electronic device 102 also includes an analog audio interface 403. The analog audio interface 403 includes hardware and/or software for outputting and/or receiving analog audio signals, as well as for encoding/embedding information in and/or decoding/extracting information from an analog audio signal. In some implementations, the analog audio interface 403 includes a speaker, a microphone, and/or a transducer.

In some implementations, the analog audio interface 403 includes physical connectors and/or sockets for making wired connections to other devices (e.g., the second electronic device 106). Examples of physical connectors include tip-ring-sleeve plugs/sockets (e.g., 3.5 mm audio connectors), universal serial bus (USB) connectors, modular connector plugs/sockets (e.g., RJ45 or RJ11 connectors), and the like. In some implementations, the analog audio interface 403 includes a modulator and/or demodulator (e.g., a modem), and/or other components for processing analog audio signals to encode/embed information in and/or decode/extract information from the analog audio signal.

Memory 412 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. Memory 412, or alternately the non-volatile memory device(s) within memory 412, includes a non-transitory computer readable storage medium. In some implementations, memory 412 or the computer readable storage medium of memory 412 stores the following programs, modules and data structures, or a subset thereof:

an operating system 416 that includes procedures for handling various basic system services and for performing hardware dependent tasks;

a network communication module 418 that is used for connecting the first electronic device 102 to other computers via the one or more network interfaces 410 (wired or wireless) and one or more communication networks, such as the Internet, other Wide Area Networks, Local Area Networks, Personal Area Networks, metropolitan area networks, VPNs, local peer-to-peer and/or ad-hoc connections, and so on;

an I/O interface module 419 that receives commands and/or inputs from a user via the I/O interface 404 (e.g., from a keyboard, touch screen, pointing device, controller, and/or microphone), and prepares and delivers outputs (e.g., speech, sound, animation, text, icons, vibrations, haptic feedback, user interface objects on a display, and light, etc.) to the user via the I/O interface 404;

a presentation module 420 for enabling presentation of media content at the first electronic device 102 through the output mechanisms associated with the I/O interface 404 (e.g., screens, speakers, headphones, etc.);

an analog audio interface module 421 that works in conjunction with the analog audio interface 403 to process received analog audio signals and/or generate analog audio signals for output by the analog audio interface 403, and includes, for example, digital-to-analog converters for converting digital information to an analog signal, and/or analog-to-digital converters for converting analog audio signals into digital information, and a modem for modulating and/or demodulating an analog carrier signal to convey digital information;

one or more client system applications module(s) 422 for enabling the first electronic device 102 to perform the methods and/or techniques described herein, the client system applications module(s) 422 including but not limited to:

a media stream reception module 424 for receiving (and, in some implementations, transcoding) media content from a server system (e.g., server system 120, FIG. 1), the media content including data needed to present media content at the first electronic device 102 and context data for the media content stream, wherein the media content stream can include a variety of media types including, but not limited to: audio media such as music, radio, audio books, and podcasts; video media such as internet videos, television programming, movies; digital photographs; and any other type of digitally transmissible media (e.g., games, images, advertisements, etc.);

a media presentation and control application 104 for presenting media content at the first electronic device 102, for controlling media presentation at other electronic devices, and/or for interacting with the server system 120, and that is associated with one or more account credentials 201 (e.g., including username(s) and password) for facilitating access to a media content provider;

a control request generation module 428 for, in response to user input, generating media control requests for transmission to the server system 120 and/or the second electronic device 106; and/or a configuration module 430 for retrieving connection information (e.g., account credentials and/or network configuration data) from other modules and/or applications of the first electronic device 102, and for causing the connection information to be embedded and/or encoded into an analog audio signal, and, in some implementations, for decoding and/or extracting connection information from an analog audio signal and providing the connection information to the appropriate modules and/or applications of the first electronic device 102;

an electronic device data module 440 for storing data, the electronic device data module 440 including but not limited to:

media content buffer(s) 105 including media content data received from a stream/transmission from the server system (e.g., server system 120, FIG. 1) and stored in the memory of the first electronic device 102 until it is presented at the first electronic device 102; and a media content database 442 for storing media content on the first electronic device (e.g., media content that is part of the user's personal library).

In some implementations, the first electronic device 102 includes a subset of the components and modules shown in FIG. 4. Moreover, in some implementations, the first electronic device 102 includes additional components and/or modules not shown in FIG. 4.

Figure 5:
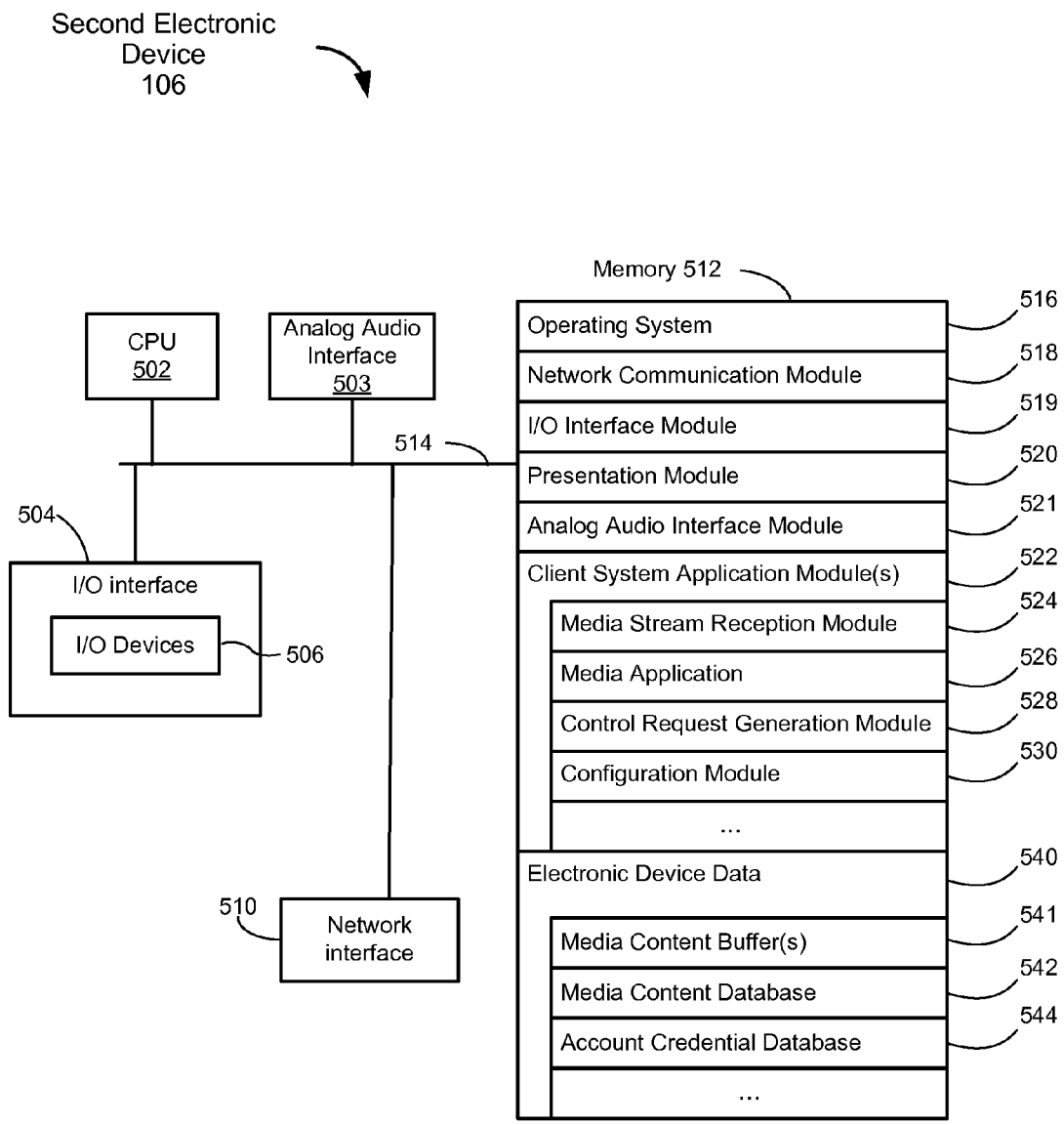
FIG. 5 is a block diagram illustrating another electronic device, in accordance with some implementations.

FIG. 5 is a block diagram illustrating a second electronic device 106, in accordance with some implementations. The second electronic device 106 typically includes one or more CPUs 502, one or more network interfaces 510, memory 512, and one or more communication buses 514 for interconnecting these components. In some implementations, the second electronic device 106 includes an I/O interface 504. The I/O interface 504 couples input/output devices 506 of the second electronic device 106, such as displays, microphones, speakers, keyboards, mice, buttons, and touch screens, to the I/O interface module 519. The I/O interface 504, in conjunction with the I/O interface module 519, receives user inputs (e.g., voice input, keyboard inputs, touch inputs, etc.) and processes them accordingly. In some implementations, the second electronic device 106 does not have an I/O interface or I/O devices 506, or those that are present do not allow simple and efficient input and selection of connection information, such as account credentials and network configuration data. For example, in some implementations, the second electronic device is a wireless or WiFi enabled speaker system with a dedicated set of audio control buttons (e.g., mechanical buttons or touch-sensitive components for play, pause, skip, volume, etc.), but without a configurable display screen or efficient means of text input.

The second electronic device 106 also includes an analog audio interface 503. The analog audio interface 503 includes hardware and/or software for outputting and/or receiving analog audio signals, as well as for encoding/embedding information in and/or decoding/extracting information from the analog audio signal. In some implementations, the analog audio interface 503 includes a speaker, a microphone, and/or a transducer. In some implementations, the analog audio interface 503 includes physical connectors for making wired connections to other devices (e.g., the first electronic device 102). Examples of physical connectors include tip-ring-sleeve plugs/sockets (e.g., 3.5 mm audio connectors), universal serial bus (USB) connectors, modular connector plugs/sockets (e.g., RJ45 or RJ11 connectors), and the like. In some implementations, the analog audio interface 503 includes a modulator and/or demodulator (e.g., a modem), and/or other components for processing analog audio signals to encode/embed information in and/or decode/extract information from the analog audio signal.

Memory 512 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. Memory 512, or alternately the non-volatile memory device(s) within memory 512, includes a non-transitory computer readable storage medium. In some implementations, memory 512 or the computer readable storage medium of memory 512 stores the following programs, modules and data structures, or a subset thereof:

- an operating system 516 that includes procedures for handling various basic system services and for performing hardware dependent tasks;
- a network communication module 518 that is used for connecting the second electronic device 106 to other computers via the one or more network interfaces 510 (wired or wireless) and one or more communication networks, such as the Internet, other Wide Area Networks, Local Area Networks, Personal Area Networks, metropolitan area networks, VPNs, local peer-to-peer and/or ad-hoc connections, and so on;
- an I/O interface module 519 that receives commands and/or inputs from a user via the I/O interface 504 (e.g., from a keyboard, touch screen, pointing device, controller, and/or microphone), and prepares and delivers outputs (e.g., speech, sound, animation, text, icons, vibrations, haptic feedback, user interface objects on a display, and light, etc.) to the user via the I/O interface 504;
- a presentation module 520 for enabling presentation of media content at the second electronic device 106 through the output mechanisms associated with the I/O interface 504 (e.g., screens, speakers, headphones, etc.);
- an analog audio interface module 521 that works in conjunction with the analog audio interface 503 to process received analog audio signals and/or generate analog audio signals for output by the analog audio interface 503, and includes, for example, digital-to-analog converters for converting digital information to an analog signal, and/or analog-to-digital converters for converting analog audio signals into digital information, and a modem for modulating and/or demodulating an analog carrier signal to convey digital information;
- one or more client system applications module(s) 522 for enabling the second electronic device 106 to perform the methods and/or techniques described herein, the client system applications module(s) 522 including but not limited to:
  - a media stream reception module 524 for receiving (and, in some implementations, transcoding) media content from a server system (e.g., server system 120, FIG. 1), the media content including data needed to present media content at the second electronic device 106 and context data for the media content stream, wherein the media content stream can include a variety of media types including, but not limited to: audio media such as music, radio, audio books, and podcasts; video media such as internet videos, television programming, movies; digital photographs; and any other type of digitally transmissible media (e.g., games, images, advertisements, etc.);
  - a media presentation and control application 526 for presenting media content at the second electronic device 106, for interacting with the server system 120, and/or, optionally, for controlling media presentation at other electronic devices;
  - a control request generation module 528 for, in response to user input, generating media control requests for transmission to the server system 120 and/or other electronic devices; and
  - a configuration module 530 for decoding and/or extracting connection information from the analog audio signal and providing the connection information to the appropriate modules and/or applications of the second electronic device 106 (e.g., the network communication module 518 and/or the account credential database 544), and, in some implementations, for retrieving connection information (e.g., account credentials and/or network configuration data) from other modules and/or applications of the second electronic device 106, and for causing the connection information to be embedded and/or encoded into an analog audio signal, and, in some implementations;
- an electronic device data module 540 for storing data, the electronic device data module 540 including but not limited to:
  - media content buffer(s) 541 including media content data received from a stream/transmission from the server system (e.g., server system 120, FIG. 1) and stored in the memory of the second electronic device 106 until it is presented at the second electronic device 106;
  - media content database 542 for storing media content on the second electronic device 106 (e.g., media content that is part of the user's personal library); and/or
  - an account credential database 544 including account information for one or more users of the second electronic device 106, including account credentials and, in some implementations, unique user identifiers for each user and/or user account.

In some implementations, the second electronic device 106 includes a subset of the components and modules shown in FIG. 5. Moreover, in some implementations, the second electronic device 106 includes additional components and/or modules not shown in FIG. 5.

Figure 6A:
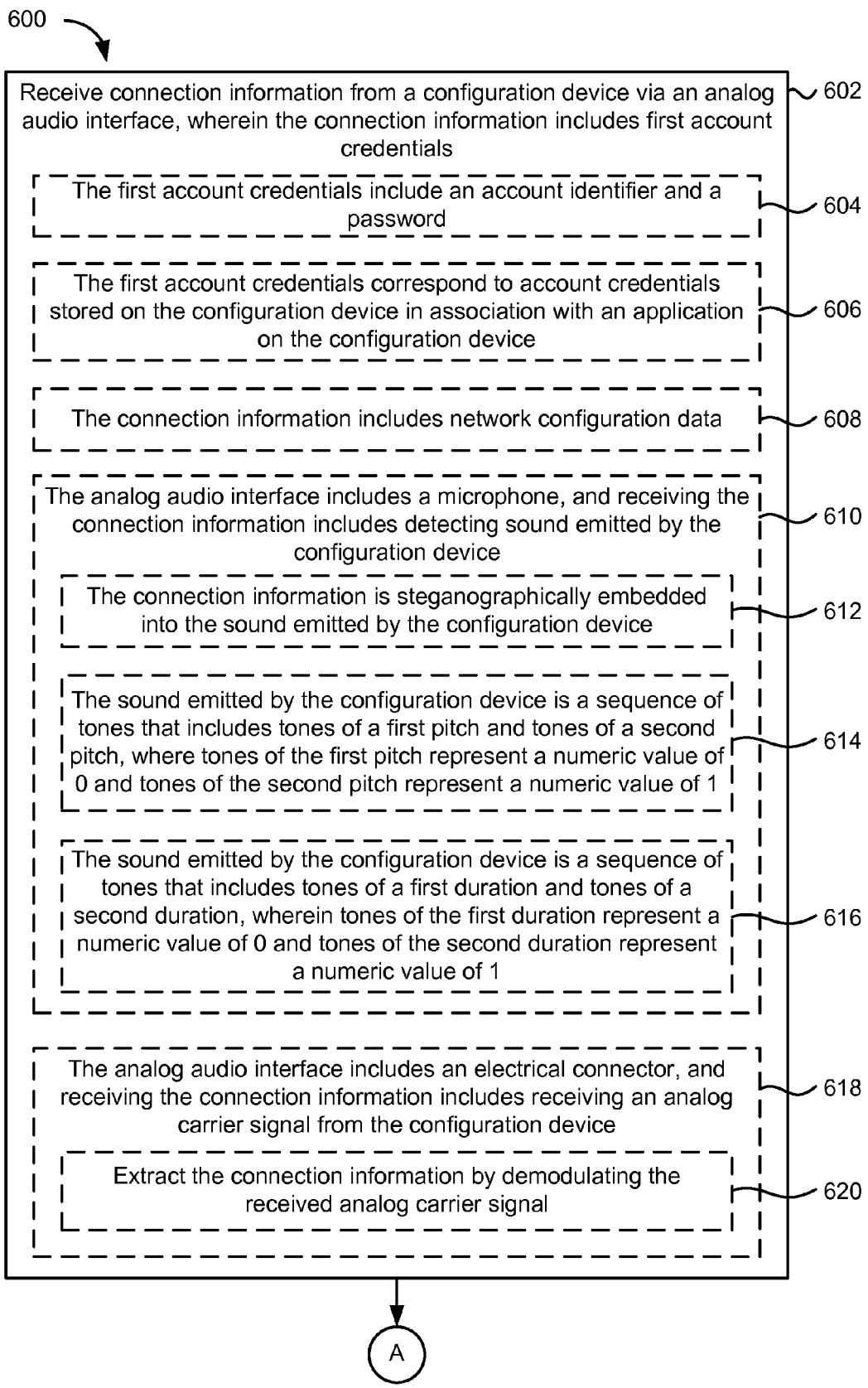
FIGS. 6A-6C are flow diagrams illustrating a method of configuring a device, in accordance with some implementations.
Figure 6B:
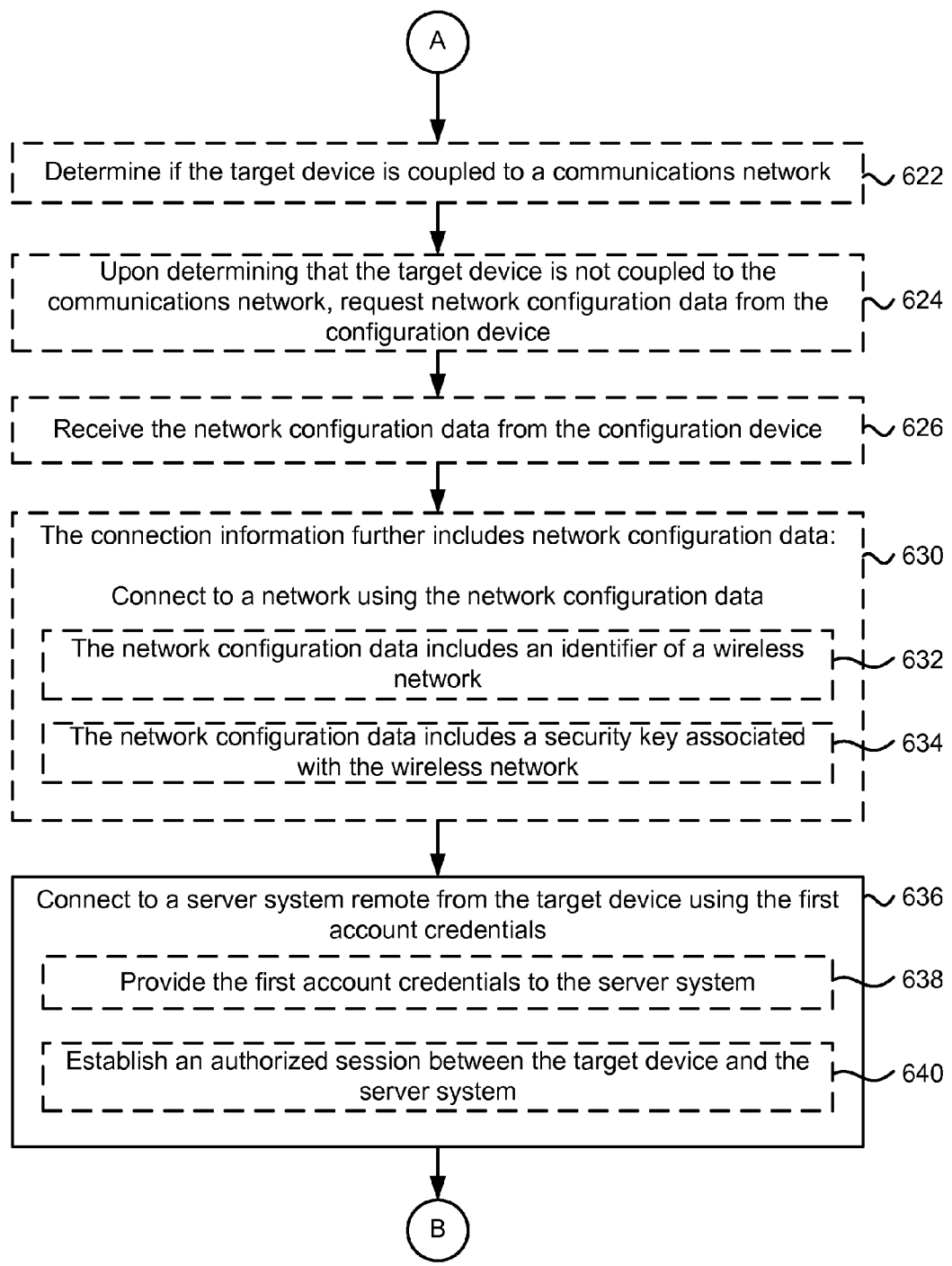
Figure 6C:
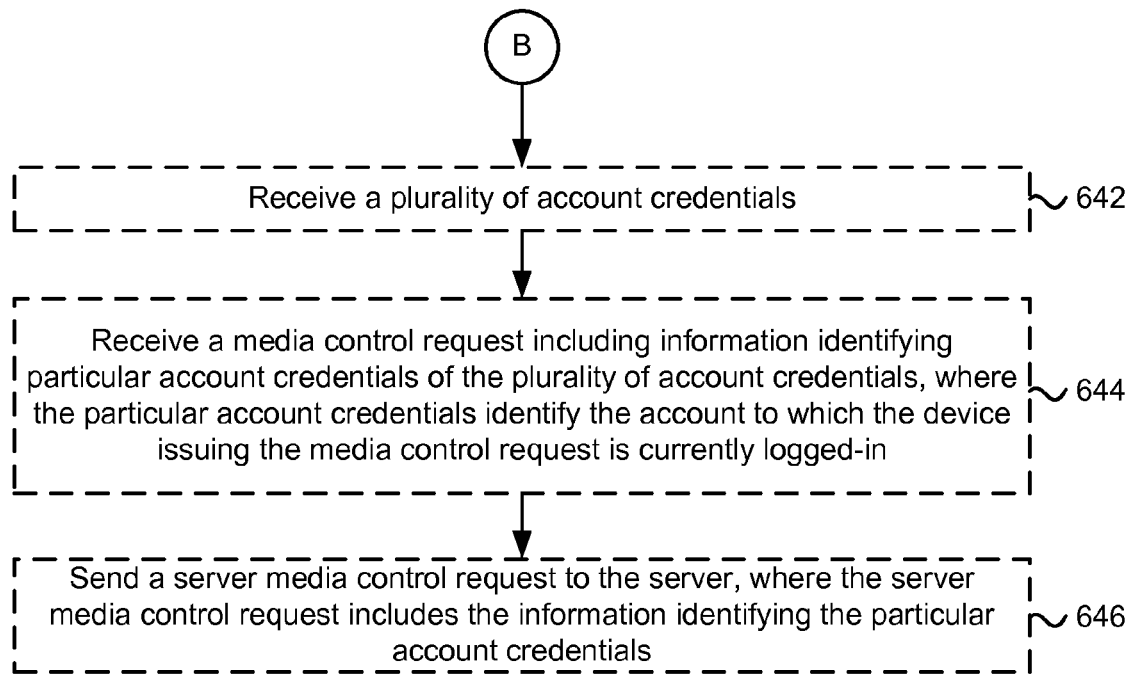

FIGS. 6A-6C are flow diagrams illustrating a method 600 of configuring a device, in accordance with some implementations. Each of the operations shown in FIGS. 6A-6C may correspond to instructions stored in a computer memory or computer readable storage medium. In some implementations, the method 600 is performed at an electronic device with one or more processors (or cores) and memory storing one or more programs for execution by the one or more processors (or cores). For example, in some implementations, the method 600 is performed at the first electronic device 102 or at the second electronic device 106. In some implementations, the method is performed by multiple electronic devices, including any combination of the first electronic device 102, the second electronic device 106, and the server system 120. Moreover, the individual steps of the method 600 may be distributed among the multiple electronic devices in any appropriate manner.

With reference to FIG. 6A, a target device (e.g., the second electronic device 106) receives connection information from a configuration device (e.g., the first electronic device 102) via an analog audio interface, wherein the connection information includes first account credentials (602).

As noted above, the connection information includes first account credentials. In some implementations, the first account credentials include an account identifier (e.g., a username, email address, or any unique identifier of a user account) and a password (604).

In some implementations, the first account credentials correspond to account credentials stored on the configuration device in association with an application on the configuration device (606). For example, the account credentials may be those stored in association with a media application on the configuration device (e.g., the media application 104) and used to authorize the media application to receive media content from a media content provider. More specifically, the configuration device may be a mobile phone with a media application with which a user receives media content, and the account credentials are the username and password that are associated with the media application in order to authorize access to the content provider.

In some implementations, the connection information includes network configuration data (608). The network configuration data is discussed herein.

As noted above with respect to step (602), the connection information is received at the target device via an analog audio interface (e.g., the analog audio interface 503, FIGS. 2, 5). Analog audio interfaces include hardware and/or software for outputting and/or receiving analog audio signals, as well as for encoding/embedding information in and/or decoding/extracting information from the analog audio signal. Analog audio signals received via the analog audio interface may take several different forms. For example, the analog audio signal may be audible sound (e.g., propagating air pressure waves), an ultrasonic or subsonic signal (e.g., propagating air pressure waves above or below the audible range), an electrical analog carrier signal (e.g., where the voltage, current, and/or frequency of an electrical signal is varied to convey information), and the like.

In some implementations, the analog audio interface includes an audio input component coupled to the target device. For example, in some implementations, the analog audio interface includes a microphone, and receiving the connection information includes detecting sound emitted by the configuration device (610). One advantage of this technique is that microphones are already found on many electrical devices, and/or can be easily and inexpensively incorporated into electrical devices.

In some implementations, the connection information is steganographically embedded (by the configuration device) into the sound emitted by the configuration device (612). In some implementations, the sound is a song, a sequence of notes and/or tones, a musical scale, spoken words, white noise, or the like. Examples of techniques for embedding information into an audio signal are discussed, for example, in "Techniques for Data Hiding," by Walter Bender et al., in IBM Systems Journal, Vol. 35, p. 313 (1996), which is hereby incorporated by reference in its entirety.

Connection information can also be encoded into the audio signal (by the configuration device) by converting the connection information into a bitstream (e.g., using a character encoding scheme) and generating the audio signal as a sequence of tones representing the digits of the bitstream. Specifically, in some implementations, the sound emitted by the configuration device is a sequence of tones that includes tones of a first frequency (i.e., pitch) and tones of a second frequency, where tones of the first frequency represent a numeric value of 0 and tones of the second frequency represent a numeric value of 1 (614). In some implementations, the sound emitted by the configuration device is a sequence of tones that includes tones of a first duration and tones of a second duration, wherein tones of the first duration represent a numeric value of 0 and tones of the second duration represent a numeric value of 1 (616).

In some implementations, the sound emitted by the configuration device is a sequence of tones that includes tones of a first volume and tones of a second volume, wherein tones of the first volume represent a numeric value of 0 and tones of the second volume represent a numeric value of 1.

As noted above, connection information (which is typically represented as alphanumeric characters) can be encoded into a bitstream (or any other transmissible format, as discussed below) using a character encoding scheme. A character encoding scheme pairs each character from a given character set with a different representation, such as a bit pattern, a natural number, a sound of a given frequency (i.e., pitch), duration, and or volume, etc. Any appropriate character encoding scheme may be used in the implementations described herein. For example, connection information may be converted to bit sequences of Morse code, American Standard Code for Information Interchange (ASCII), Baudot code, Extended Binary Coded Decimal Interchange Code (EBCDIC), Unicode, etc. Bit sequences for any of these character encoding schemes (and others not mentioned) can be transmitted over an audio signal as described above (e.g., by mapping bits to sounds of different frequency, duration, and/or volume).

Other ways of converting and encoding the connection information into transmissible information are also contemplated. In particular, instead of a bitstream (i.e., that only includes values representing 0 and 1), the connection information may be converted into a format that can represent more than two different values. For example, each of the alphanumeric characters that make up the connection information can be mapped to a sound of different frequency, duration, and/or volume, and the corresponding sound can be output to a target device that decodes or otherwise converts the received sound back into alphanumeric characters (or any other suitable form). As a specific example, the 26 letters of the English alphabet and the 10 single-digit integers (i.e., 0-9) can be mapped to tones of 36 different frequencies.

In some implementations, amplitude modulation and/or angle modulation techniques are used to modulate an audible analog carrier frequency to include the connection information. For example, an analog carrier signal can be an audible sound (or supersonic/subsonic frequency or frequency range) emitted by the configuration device and received by a target device. In some implementations, the analog carrier frequency is modulated to include a bitstream according to a character encoding scheme described above (e.g., Morse code, ASCII, etc.).

In some implementations, the analog carrier signal is modulated to include representations of more than two characters. For example, in some implementations, each of the 36 alphanumeric characters is represented as a different detectable modulation pattern and/or sequence. Accordingly, the configuration device modulates the carrier signal to include the connection information, and a target device receives the analog carrier signal, demodulates the signal, and extracts the connection information.

Connection information may also be received within an electrical signal, using a wired interface. For example, in some implementations, the analog audio interface includes an electrical connector (e.g., for a 3.5 mm "tip-ring-sleeve" style audio plug), and receiving the connection information includes receiving an analog carrier signal from the configuration device (618). This technique can also advantageously use analog audio interfaces already found on many exemplary target and configuration devices, such as audio output sockets (e.g., a headphone socket) and audio input sockets (e.g., "line-in" audio sockets on computers, speaker/stereo systems, receivers, and the like).

As described herein, the configuration device can modulate (e.g., with a modem) an analog carrier signal to encode digital information corresponding to the connection information (i.e., using digital modulation). Accordingly, in some implementations, the target device extracts the connection information by demodulating the received analog carrier signal (620). Standard modem techniques for modulating and/or demodulating an analog carrier signal may be used in various implementations. Examples of digital modulation techniques include phase-shift keying, frequency-shift keying, amplitude-shift keying, on-off keying, continuous phase modulation, orthogonal frequency-division multiplexing, wavelet modulation, trellis coded modulation, quadrature amplitude modulation, and the like.

Turning to FIG. 6B, once the connection information including the first account credentials are received, the target device connects to a server system remote from the target device using the first account credentials (636). In some implementations, connecting to the server system includes providing the first account credentials to the server system (638) and/or otherwise establishing an authorized session between the target device and the server system (640).

In some implementations, the connection information further includes network configuration data, which is used by the target device to connect to a communications network, such as a Local Area Network and/or the Internet. In some implementations, the method 600 includes steps and/or procedures for receiving network information from a configuration device, as described below.

In some cases, network configuration data is provided to the target device only when the target device is not already configured to connect (or is not already connected) to a network. In particular, in some implementations, the target device determines if it is coupled to a communications network (e.g., a LAN, the Internet, etc.) (622). In some implementations, the determination is made when the configuration device connects to or establishes communications with the target device.

Upon determining that the target device is not coupled to the communications network, the target device requests network configuration data from the configuration device (624) (e.g., by communicating over an analog audio interface, as described above). Alternatively, n some implementations, the target device does not request network configuration data from the configuration device. For example, the target device receives the network configuration data (e.g., at step 626) even though it did not issue an explicit request to the configuration device for the network configuration information.

The target device then receives the network configuration data from the configuration device (626).

Once the target device receives the network configuration data, the target device connects to a network using the network configuration data (630). The network configuration may data include an identifier of a wireless network (632) (e.g., a service set identifier (SSID)), a security and/or encryption type, and/or a security key associated with the wireless network (634) (e.g., a Wired Equivalent Privacy (WEP) key; a Wi-Fi Protected Access (WPA) key, etc.).

In some implementations, the network configuration data corresponds to network configuration data of a network to which the configuration device is connected. For example, the network configuration data is an SSID and security key of a network to which a mobile phone (being used as a configuration device) is connected when the phone is being used to configure a WiFi-enabled speaker system (the target device).

In some implementations, the network configuration data is acquired from a network configuration setting of the configuration device. For example, the SSID and security key for a wireless network are retrieved from storage, an operating system, and/or a network communication module of the configuration device.

In some implementations, the network configuration data is manually entered at the configuration device by a user prior to it being received by the target device. This technique may be used when the configuration device does not have or does not permit access to stored network configuration data.

In some implementations, after connecting to the server system (e.g., at step (636)), the target device receives media content from the server system, and presents the media content. For example, after logging in to the server with the account credentials, the target device receives streaming music from the server, which is associated with a media content provider, and presents the music to the user via speakers. Other media content (e.g., audio books, podcasts, radio stations, etc.) and other media delivery techniques (e.g., download and persistent storage) are also possible.

Accordingly, turning to FIG. 6C, in some implementations, the target device receives a plurality of account credentials (642). (The plurality of account credentials include the first account credentials identified above.) For example, several different users may provide account credentials to a target device so that they can each control the target device using their own account identity. As a specific example, if the target device is a speaker system in a household, individual family members can provide their own account credentials so that they can each control the speaker system via their own account. At least some of the plurality of account credentials are received from one or more electronic devices via an audio interface, as described above.

In some implementations, the target device receives a media control request including information identifying particular account credentials of the plurality of account credentials (644), where the particular account credentials identify the account to which the device issuing the media control request is currently logged-in.

In some implementations, the information identifying the particular account credentials includes the account credentials themselves (e.g., a username and a password).

In some implementations, the information identifying the particular account credentials includes a unique user, account, or device identifier (e.g., a media access control (MAC) address or IP address of the requesting device), which can be used to identify the account credentials in the account credential database with which the media control request is associated.

In some implementations, the target device then sends a server media control request to the server, where the server media control request includes information identifying the particular account credentials (646).

Figure 7A:
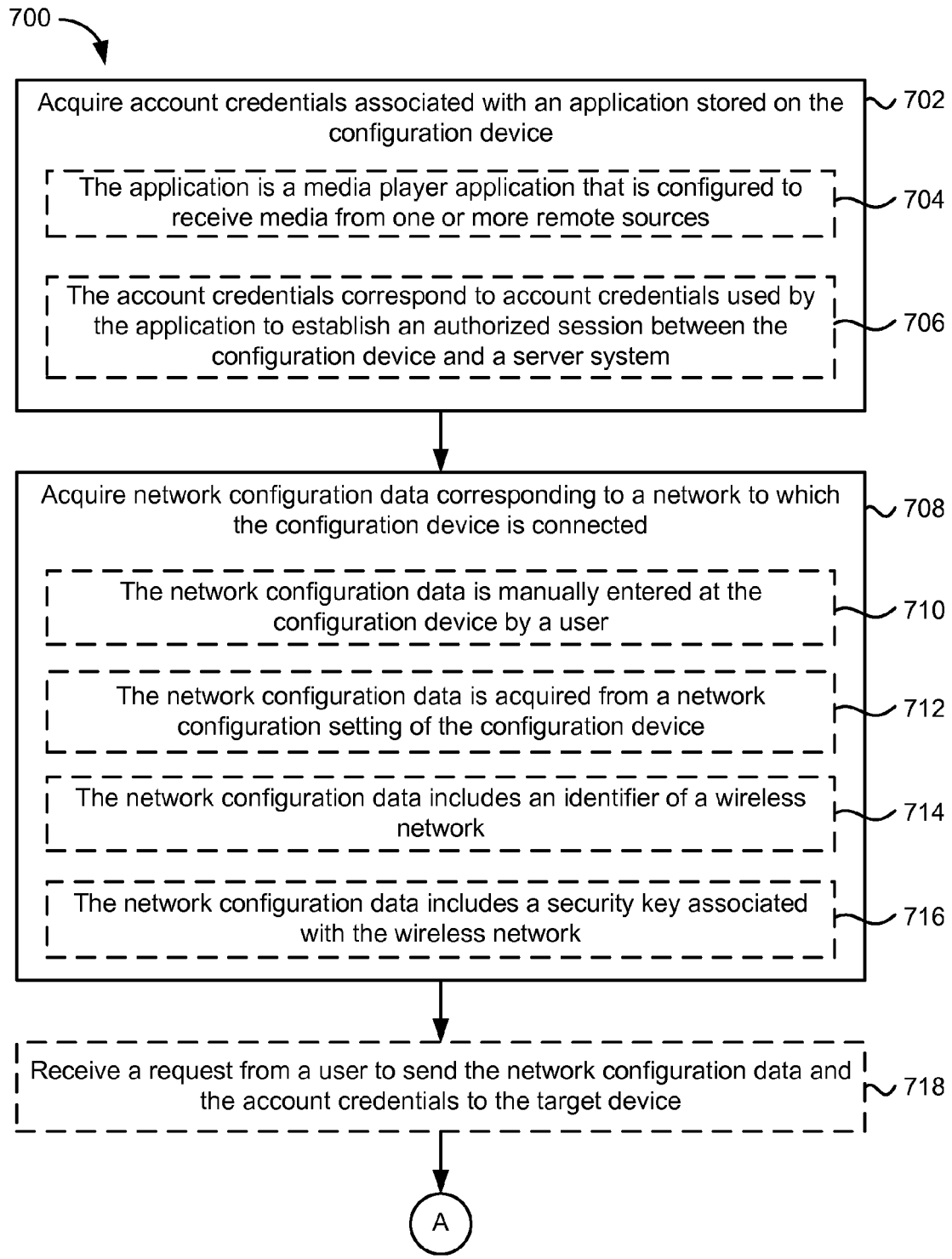
FIGS. 7A-7B are flow diagrams illustrating another method of configuring a device, in accordance with some implementations.
Figure 7B:
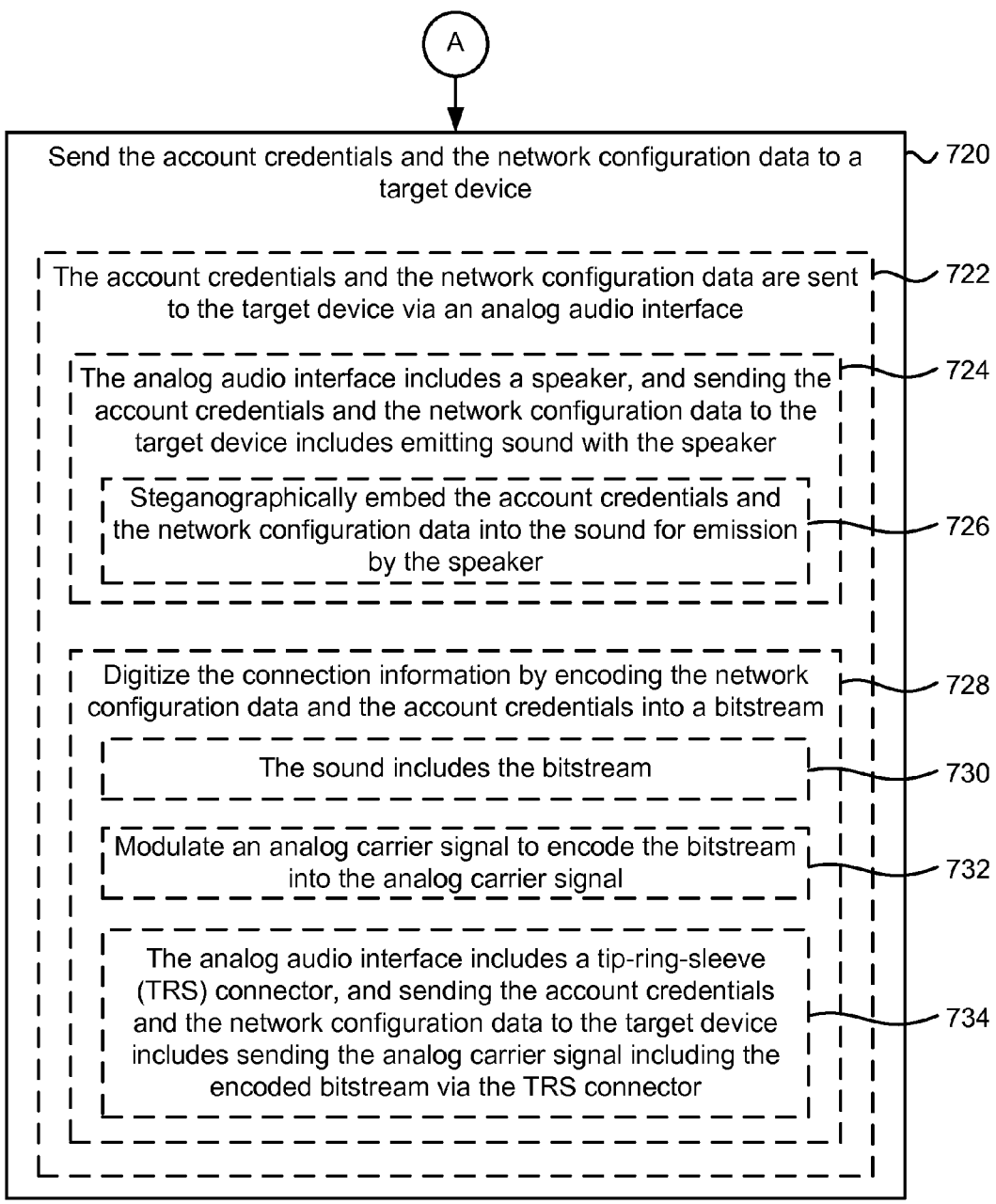

FIGS. 7A-7B are flow diagrams illustrating a method 700 of configuring a device, in accordance with some implementations. Each of the operations shown in FIGS. 7A-7B may correspond to instructions stored in a computer memory or computer readable storage medium. In some implementations, the method 700 is performed at an electronic device with one or more processors (or cores) and memory storing one or more programs for execution by the one or more processors (or cores). For example, in some implementations, the method 700 is performed at the first electronic device 102 or at the second electronic device 106. In some implementations, the method is performed by multiple electronic devices, such as the first electronic device 102, the second electronic device 106, and the server system 120. Moreover, the individual steps of the method 700 may be distributed among the multiple electronic devices in any appropriate manner.

With reference to FIG. 7A, a configuration device (e.g., the first electronic device 102, FIG. 2) acquires account credentials associated with an application stored on the configuration device (702). As described above, in some implementations, the application is a media player application that is configured to receive media from one or more remote sources (704), such as the server system 120 associated with the media content provider 119.

In some implementations, the account credentials correspond to account credentials used by the application to establish an authorized session between the configuration device and a server system (706). For example, the configuration device may be a mobile phone with a media application (e.g., the media application 104) that provides access to streaming media content, where a user has previously input his or her account credentials into the media application 104. The configuration device then retrieves the account credentials from the media application and sends them to the target device, as discussed below.

The configuration device acquires network configuration data corresponding to a network to which the configuration device is connected (708). In some implementations, the network configuration data is entered at the configuration device by a user (710) (e.g., if the configuration device does not permit access to stored network configuration data, the user can manually select an SSID and input a security key).

In some implementations, the network configuration data is acquired from a network configuration setting of the configuration device (712). For example, the configuration device may be a mobile phone that is configured to connect to a user's home wireless network. The configuration device retrieves the network configuration data that the mobile phone uses to connect to the home wireless network, such as from storage, an operating system, and/or a network communication module, as described above.

In some implementations, the network configuration data includes an identifier of a wireless network (714) (e.g., a service set identifier (SSID)), a security and/or encryption type, and/or a security key associated with the wireless network (716) (e.g., a Wired Equivalent Privacy (WEP) key; a Wi-Fi Protected Access (WPA) key, etc.).

In some implementations, the configuration device receives a request from a user to send the network configuration data and the account credentials to the target device (718). For example, a media application on the configuration device may provide an affordance (e.g., a button or selectable touchscreen element) that, when selected by the user, causes one or both of the network configuration data and the account credentials to be sent to the target device.

Turning to FIG. 7B, the configuration device sends the account credentials and the network configuration data (i.e., connection information) to a target device (720). In some implementations, the target device is the second electronic device 106. The target device is a digital media player, a WiFi enabled speaker system, a home audio/visual system (e.g., a stereo, home audio/visual receiver), or any other appropriate electronic device.

In some implementations, the account credentials and the network configuration data are sent to the target device via an analog audio interface (722). In some implementations, the analog audio interface includes a speaker, and sending the account credentials and the network configuration data to the target device includes emitting sound with the speaker (724).

As described above with reference to the method 600, in some implementations, the configuration device steganographically embeds the account credentials and the network configuration data into the sound for emission by the speaker (726). Also as described, in some implementations, the sound is a song, a sequence of notes and/or tones, a musical scale, spoken words, white noise, or the like. Examples of techniques for embedding information into an audio signal are discussed, for example, in "Techniques for Data Hiding," by Walter Bender et al., in IBM Systems Journal, Vol. 35, p. 313 (1996), which is hereby incorporated by reference in its entirety.

In some implementations, the configuration device digitizes the connection information by encoding the network configuration data and the account credentials into a bitstream (728). Accordingly, as described above with reference to the method 600, the connection information can be sent to the target device by emitting sounds that include and/or represent the bitstream (730). For example, a sequence of tones including tones of a first pitch and tones of a second pitch, wherein tones of the first pitch represent a numeric value of 0 and tones of the second pitch represent a numeric value of 1, or a sequence of tones including tones of a first duration and tones of a second duration, wherein tones of the first duration represent a numeric value of 0 and tones of the second duration represent a numeric value of 1.

In some implementations, the configuration device modulates an analog carrier signal to encode the bitstream into the analog carrier signal (732) (e.g., with a modem). In some implementations, the analog audio interface includes a tip-ring-sleeve (TRS) connector, and sending the account credentials and the network configuration data to the target device includes sending the analog carrier signal including the encoded bitstream via the TRS connector (734). The analog carrier signal may be sent to the target device via an electrical cable, and the bitstream may be decoded from the signal using a modem at the target device. The target device may then use the connection information to connect to a network, and/or otherwise establish an authorized session with a remote server system.

Additional descriptions of techniques for encoding and/or modulating connection information into audio and electrical signals are described above with respect to FIG. 6, and apply equally to the techniques and/or methods described with respect to FIG. 7.

The methods illustrated in FIGS. 6A-7B may be governed by instructions that are stored in a computer readable storage medium and that are executed by at least one processor of at least one server. Each of the operations shown in FIGS. 6A-7B may correspond to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors (or cores).

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A target device, comprising:
   one or more processors; and
   memory storing one or more programs, wherein the one or more programs are configured to be executed by the one or more processors, the one or more programs including instructions for:
   receiving connection information from a configuration device, via an analog audio interface, the connection information including network configuration data for a network to which the configuration device is connected and a plurality of account credentials, the plurality of account credentials including first account credentials, wherein the first account credentials include a password;
   storing respective ones of the plurality of account credentials in association with respective unique user identifiers;
   connecting to the network using the network configuration data;
   receiving a media control request including information identifying the first account credentials, wherein the information identifying the first account credentials is one of the unique user identifiers;
   connecting, using the network, to a server system remote from the target device using the first account credentials; and
   sending a server media control request to the server system, the server media control request including the information identifying the first account credentials.

2. The target device of claim 1, wherein connecting to the server system comprises:
   providing the first account credentials to the server system; and
   establishing an authorized session between the target device and the server system.

3. The target device of claim 1, wherein the analog audio interface includes an audio input component coupled to the target device.

4. The target device of claim 1, wherein the analog audio interface includes a microphone, and receiving the connection information includes detecting sound emitted by the configuration device.

5. The target device of claim 4, wherein the configuration information is steganographically embedded into the sound emitted by the configuration device.

6. The target device of claim 1, wherein the analog audio interface includes a tip-ring-sleeve (TRS) connector, and receiving the connection information includes receiving, via the TRS connector, an analog carrier signal emitted by the configuration device.

7. The target device of claim 6, wherein the analog carrier signal includes digitized data corresponding to the connection information.

8. The target device of claim 7, the one or more programs further including instructions for extracting the connection information by demodulating the received analog carrier signal.

9. The target device of claim 1, wherein the network configuration data is manually entered at the configuration device by a user.

10. The target device of claim 1, wherein the network configuration data is acquired from a network configuration setting of the configuration device.

11. The target device of claim 1, wherein the network is a wireless network and the network configuration data includes an identifier of the wireless network.

12. The target device of claim 11, wherein the identifier is a service set identifier (SSID).

13. The target device of claim 11, wherein the network configuration data includes a security key associated with the wireless network.

14. The target device of claim 1, wherein the first account credentials further include an account identifier.

15. The target device of claim 14, wherein the first account credentials correspond to account credentials stored on the configuration device in association with an application on the configuration device.

16. A method of configuring a device, comprising:
- at a target device with a processor and memory storing instructions for execution by the processor:
    - receiving connection information from a configuration device, via an analog audio interface, the connection information including network configuration data for a network to which the configuration device is connected and a plurality of account credentials, the plurality of account credentials including first account credentials, wherein the first account credentials include a password;
    - storing respective ones of the plurality of account credentials in association with respective unique user identifiers;
    - connecting to the network using the network configuration data;
    - receiving a media control request including information identifying the first account credentials, wherein the information identifying the first account credentials is one of the unique user identifiers;
    - connecting, using the network, to a server system remote from the target device using the first account credentials; and
    - sending a server media control request to the server system, the server media control request including the information identifying the first account credentials.

17. A non-transitory computer-readable storage medium storing one or more programs, the one or more programs comprising instructions, which, when executed by a target device with one or more processors, cause the target device to:
- receive connection information from a configuration device, via an analog audio interface, the connection information including network configuration data for a network to which the configuration device is connected and a plurality of account credentials, the plurality of account credentials including first account credentials, wherein the first account credentials include a password;
- store respective ones of the plurality of account credentials in association with respective unique user identifiers;
- connect to the network using the network configuration data;
- receive a media control request including information identifying the first account credentials, wherein the information identifying the first account credentials is one of the unique user identifiers;
- connect, using the network, to a server system remote from the target device using the first account credentials; and
- send a server media control request to the server system, the server media control request including the information identifying the first account credentials.

* * * * *